United States Patent [19]

Sato et al.

[11] 4,368,360
[45] Jan. 11, 1983

[54] ADAPTIVE CONTROL TYPE ECHO SUPPRESSOR

[75] Inventors: Akira Sato; Masamichi Niiya, both of Tokyo; Masayuki Takeuchi, Hino; Masaru Fukai, Ichikawa; Sotokichi Shintani, Tokyo, all of Japan

[73] Assignee: Kokusai Denshin Denwa Kabushiki Kaisha, Japan

[21] Appl. No.: 145,492

[22] Filed: May 1, 1980

Related U.S. Application Data

[63] Continuation-in-part of Ser. No. 958,948, Nov. 8, 1978, abandoned.

[30] Foreign Application Priority Data

Nov. 8, 1977 [JP] Japan ............................. 52-133107

[51] Int. Cl.³ ............................................. H04B 3/20
[52] U.S. Cl. ................................ 179/170.2; 179/170.6
[58] Field of Search .............. 179/1 HF, 170.2, 170.6, 179/170.8

[56] References Cited

U.S. PATENT DOCUMENTS

| | | | |
|---|---|---|---|
| 3,826,878 | 7/1974 | Bendel | 179/170.6 |
| 3,894,187 | 7/1975 | Shibata et al. | 179/1 HF |
| 3,906,172 | 9/1975 | Hoeschele, Jr. et al. | 179/170.6 |
| 3,942,116 | 3/1976 | Ferguson | 179/170.6 |
| 3,952,166 | 4/1976 | Kato et al. | 179/170.6 |

Primary Examiner—G. Z. Rubinson
Assistant Examiner—Randall P. Myers
Attorney, Agent, or Firm—Robert E. Burns; Emmanuel J. Lobato; Bruce L. Adams

[57] ABSTRACT

An adaptive control type echo suppressor which compares the levels of voice signals of sending and receiving paths by a first comparator with each other and cuts off the sending path to suppress an echo when the level of the voice signal of the receiving path is higher than the level of the voice signal of the sending path. A control loop is provided for applying the voice signal from the receiving path to a second comparator via a variable loss circuit for comparing the peak of the integrated value of the same with the peak level of the integrated value of the voice signal of the sending path to effect adaptive control of the variable loss circuit by the output of the second comparator in a manner to reduce the output of the second comparator to zero. Each of the integrated values are obtained under a relatively long time constant characteristic to prevent influence of noise of the sending and the receiving paths, and the output of the variable loss circuit is applied as the voice signal of the receiving path to the first comparator.

2 Claims, 3 Drawing Figures

ADAPTIVE CONTROL TYPE ECHO SUPPRESSOR

CROSS-REFERENCE TO RELATED APPLICATION

This application is a continuation-in-part of our co-pending application of Ser. No. 958,948 filed on Nov. 8, 1978 and now abandoned.

BACKGROUND OF THE INVENTION

This invention relates to an echo suppressor for effectively preventing an echo disturbance in a long delay telephone circuit.

An object of this invention is to provide an adaptive control type echo suppressor which employs a convergent algorithm for the estimation of an echo return loss and detects and controls the peaks of integrated values of receiving and sending speech signals.

SUMMARY OF THE INVENTION

According to the present invention, there is provided an adaptive control type echo suppressor which compares the levels of voice signals of sending and receiving paths by a first comparator with each other and cuts off the sending path to suppress an echo when the level of the voice signal of the receiving path is higher than the level of the voice signal of the sending path, characterized in that a control loop is provided for applying the voice signal from the receiving path to a second comparator via a variable loss circuit for comparing the peak of the integrated value of the same with the peak level of the integrated value of the voice signal of the sending path to effect adaptive control of the variable loss circuit by the output of the second comparator in a manner to reduce the output of the second comparator to zero, that each of the integrated values are obtained under a relatively long time constant characteristic to prevent influence of noise of the sending and the receiving paths, and that the output of the variable loss circuit is applied as the voice signal of the receiving path to the first comparator. The adaptive control of the variable loss circuit is successively performed step by step for each predetermined time width.

BRIEF DESCRIPTION OF THE DRAWINGS

This invention will be described with reference to the accompanying drawings, in which.

DETAILED DESCRIPTION OF THE INVENTION

Before entering into a description of the principles of this invention, a system heretofore proposed will be described first with reference to FIG. 1.

Figure 1:
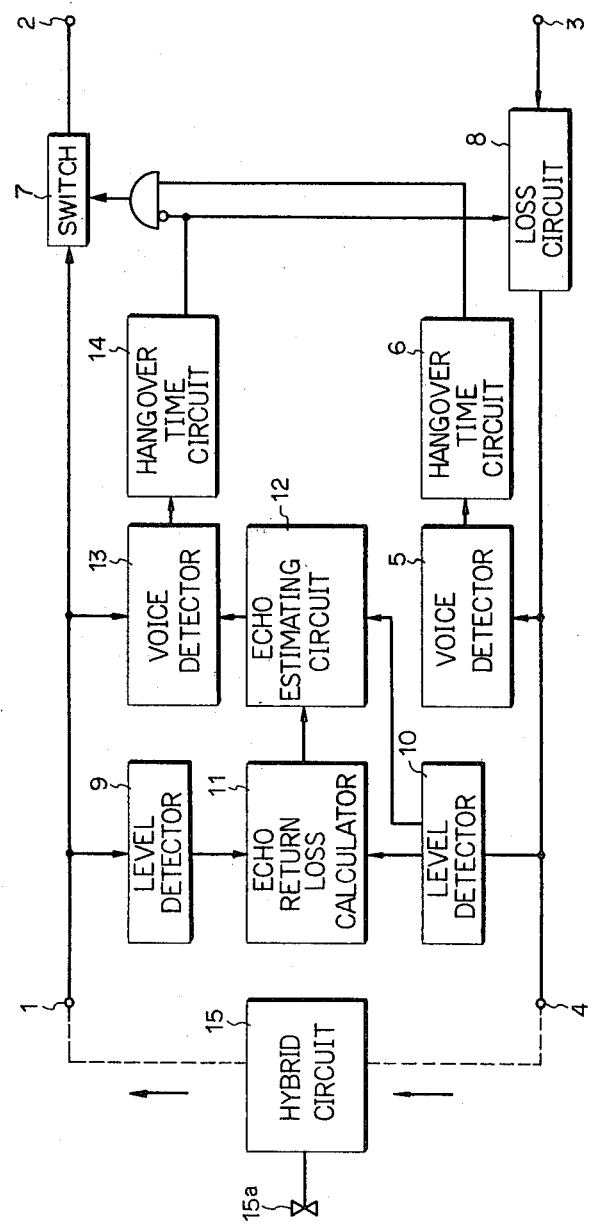
FIG. 1 is a block diagram explanatory of the operating principles of a conventional system.

FIG. 1 shows a block diagram of a conventional echo suppressing system, such as shown in a Conference Record, 1976, International Conference on Communications, Volume III, pp. 36-4~36-8, titled "Digital Adaptive Echo Suppressor". In FIG. 1, a far-end talker's voice signal arrives at a receiving input terminal 3 and thence reaches a subscriber 15a via a receiving output terminal 4, a hybrid circuit 15 and a two-wire section of the domestic telephone system. At a sending input terminal 1 arrive a near-end sending speech signal and an echo. The sending signal is delivered out of a sending output terminal 2 to the far-end, while the echo is cut off by a switch 7 via a receiving voice detector 5 and a hangover time circuit 6 employed for protection against a terminal delay. The voice detector 5 detects an input voice signal by the use of a dc threshold level. A hangover time circuit 6 is a conventional timer for maintaining the output state "1" of the detector 5 by a predetermined hangover time (e.g. 50 milli-seconds) after the termination of the detected output "1". For reducing an echo in a one-way communication state or an interruption communication state, a loss circuit 8 having a constant loss is inserted in the receiving path.

In the conventional system, the speech signals at the sending input terminal 1 and the receiving input terminal 3 are detected by level detectors 9 and 10, respectively. Let the detected levels of the speech signals be represented by LS and LR, respectively. Moreover, it is assumed in consideration of the terminal delay $\tau$, the detected value LS indicates the peak value of the signal on the sending side from the time $t-\tau$ to time t, and the detected value LR is indicated by the peak value of the signal at the receiving side before the time $\tau$. In this system, the ratio (LS/LR) of the detected value LS to the detected value LR is obtained by an echo return loss calculator 11, and the calculated value is used as an estimated value of an echo return loss. The estimated value of this echo return loss is multiplied by the signal level of the receiving side in an echo estimating circuit 12, and the resulting product is used as an estimated echo level. This estimated value is used as the threshold level for the detection of an interruption signal in a sending voice detector 13. The above operations are repeatedly carried out every $\tau$ time interval, and the interruption threshold level calculated and the signal of the sending side are compared with each other to control the interruption operation via a conventional hangover time circuit 14, which maintains the output state of "1" of the sending voice detector 13 by a predetermined hangover time (e.g. 200 milli-seconds) after termination of the detected output of the detector 13.

In the actual calculation of the echo estimated value, there is a case where the input signal of the sending side substantially includes only an echo of the receiving speech signal which occurs in the terminal equipment section and a case where the abovesaid input signal further includes the sending speech signal. Accordingly, this conventional system has a defect such that in the latter case, the echo return loss estimated value (LS/LR) is apparently decreased so as to result in difficult interrupting or a phenomenon of cutting off the beginning of a speech signal. To compensate for the above, this system is required to set the hangover time for interrupting long, which leads to the drawback of increased residual echo. Moreover, since the signal peak value detectors for both the receiving side and the sending side are employed for detecting the receiving speech signal and the sending speech signal, if a pulsive high-level signal is applied by any cause to the level detector 10 at the receiving side, the echo return loss estimated value (LS/LR) apparently decreases to make interrupting difficult and cut off the beginning of the speech signal.

A description will be given of the convergent algorithm for use in this invention. This is employed for obtaining an estimated value of an echo return loss.

Now, it is assumed that the receiving input, an echo and the sending input be represented by R(t), e(t) and S(t), respectively. An echo return loss r is given as follows:

$$r = R(t) - e(t) \qquad (1)$$

In practice, however, the echo e(t) and the sending input S(t) cannot be distinguished from each other, so let it be assumed that the sending input includes the component e(t)+S(t). In the conventional echo suppressor, the interrupting threshold is as follows:

$$R(t) \qquad (2)$$

Accordingly, when $e(t) + S(t) \geq R(t)$, the interruption takes place. In this invention, an initial threshold (when $t = t_0$) is taken as R(t). This corresponds to a condition where the echo return loss $r = 0$. Let this be represented by $r_0$. Next, when $e(t_1) + S(t_1) < R(t_1)$ at the time $t_1$ after the time $t_0$ (when no interruption takes place), an operation $R(t_1) - \{e(t_1) + S(t_1)\} = r_1$ is effected. A next interrupting threshold is set as follows:

$$R(t) - r_1 \qquad (3)$$

Next, when $e(t_2) + S(t_2) < R(t_2)$ at a time $t_2$, an operation $R(t_2) - r_1 - \{e(t_2) + S(t_2)\}$ is effected. Then, a next interrupting threshold is set as follows:

$$R(t) - r_1 - r_2 \qquad (4)$$

Thereafter, subsequent interrupting thresholds are similarly obtained, and as a result, the final interrupting threshold becomes as follows:

$$R(t) - \sum_{r=0}^{n} r_i \qquad (5)$$

The aboverepresented $r_0, r_1, r_2, -r_n$ are values which are fed back to a variable loss circuit 16 at the time $t_0, t_1, t_2, -t_n$, respectively. By repeating the operations of each detecting a level difference between the receiving input signal and the sending input signal including an echo and recorrecting and estimating an echo return loss from the incoming signal on the basis of the detected level difference, the estimated echo return loss can be ultimately converged to a true echo return loss.

Next, a description will be made of the detection of the peaks of integrated values of the sending and receiving speech signals. The input signal R(t) of the receiving side is integrated for each time width ($i_0$), and then the peak value of the integrated values successively produced is detected, which is obtained within a time equal to or a little longer than the terminal delay time ($\tau$). With this peak value of the integrated values, lowering of an impulsive noise and fluctuation of the peak of a voice signal can be alleviated. The input signal S(t) of the sending side is also integrated for the time width $i_0$ and is sampled at time intervals of ($\tau \times 2$) which is twice the terminal delay time ($\tau$). It is evident that a signal (S(t)+e(t)) including the echo e(t) is detected in the peak value of the integrated input signal detected.

Figure 2:
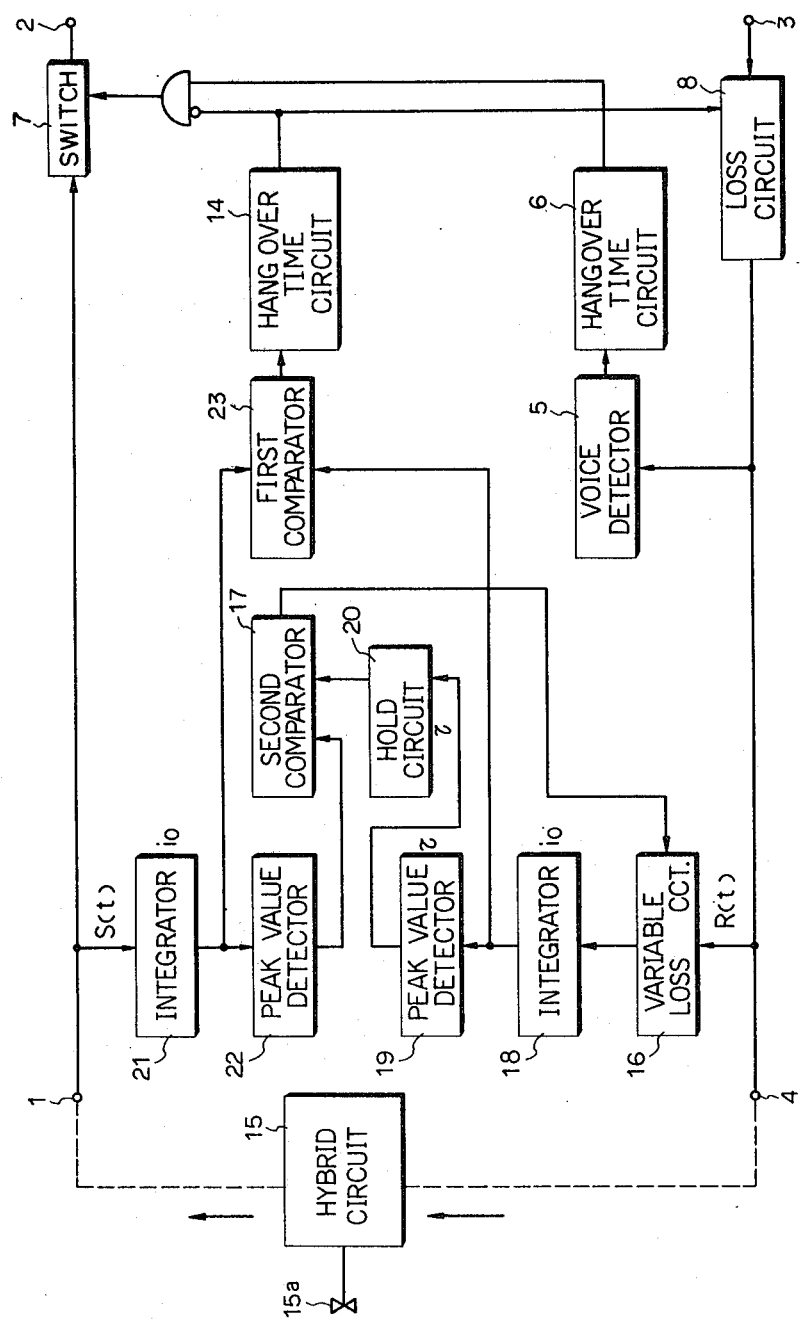
FIG. 2 is a block diagram illustrating an embodiment of this invention.

FIG. 2 illustrates an embodiment of this invention. The sending path and the receiving path perform the same operations as those in FIG. 1. One part of the far-end talker's voice arriving at the receiving input terminal 3 is separated into the receiving voice detector 5 and the variable loss circuit 16, the other part being applied to the near-end subscriber 15a. The receiving voice detector 5 is a conventional voice level detector and produces an output of "1" or "0" in dependence on whether the input thereto exceeds or not a certain signal threshold level (for example, −31 dBmo). The output thus provided is applied as a gate input signal to the switch 7 via the conventional hangover time circuit 6 to cut off the sending path. For a certain hangover time (50 ms, for instance) after the time when the output of the receiving voice detector 5 is altered from the state "1" to the state "0", the hangover time circuit 6 retains the gate input signal to the switch 7 (which becomes the OFF-state by an AND gate output "1" and the ON-state by the state "0") in the state "1" to prevent the cutting off of the beginning of the sending speech signal. The variable loss circuit 16 is set to the value of an estimated echo return loss by a signal from a second comparator 17 to attenuate the receiving input signal. In an integrator 18, the receiving voice signal having passed through the variable loss circuit 16 is integrated for each time $i_0$ (long enough to prevent the influence of an impulsive signal), and the integrated value is applied for each time $i_0$ to a peak value detector 19. In the peak value detector 19, the peak value of the integrated values is detected within the terminal delay time $\tau$, and the detected peak value is delayed by a hold circuit 20 for the time $\tau$ and then supplied to the second comparator 17.

The sending input signal S(t) is integrated by an integrator 21 for the time $i_0$, and a maximum peak value is detected by a peak value detector 22 for a period of time ($\tau \times 2$) and applied to the second comparator 17. The second comparator 17 is a circuit which provides a signal for setting the estimated echo return loss in the variable loss circuit 16 and has, as described below, a function of calculating a difference between the outputs from the peak value detector 22 and the holding circuit 20. A first comparator 23 produces an output of "1" when the input level from the sending side is higher than the input level from the receiving side, releasing interrupting at the sending side. The hangover time circuit 14 provides a hangover time for interrupting the sending speech and holds the gate input signal to the switch 7 in the state "1" for such a certain period of time (for example, 200 ms) as not to cut off the end of the sending speech signal or cause a residual echo after the output of the comparator 23 is altered from the state "1" to the state "0".

Figure 3:
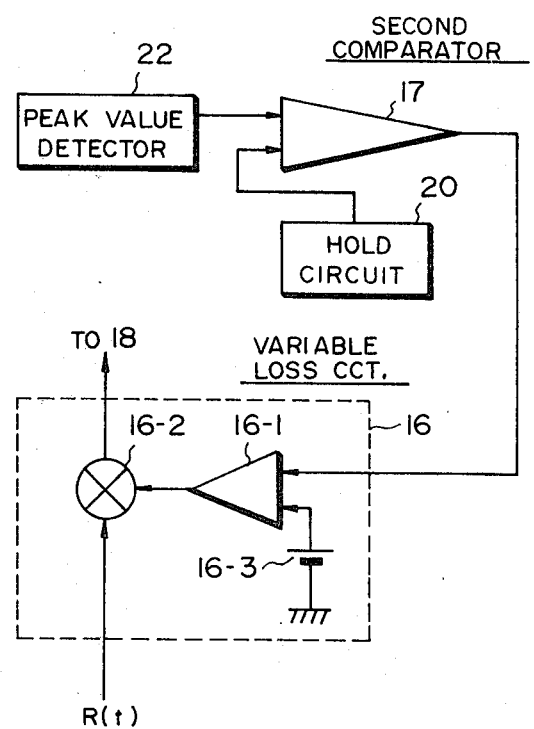
FIG. 3 is a circuit diagram illustrating examples of circuits employed in the embodiment shown in FIG. 2.

As shown in FIG. 3, the second comparator 17 is a differential amplifier, by way of example, which produces an amplified output of a difference between respective inputs from the peak value detector 22 and the hold circuit 20. The variable loss circuit 16 comprises, by way of example, a differential amplifier 16-1, an analog multiplier 16-2 and a reference voltage source 16-3. The voltage $V_r$ of the reference voltage source 16-3 is determined so that the output of the analog multiplier 16-2 assumes the value R(t) in case of the zero value of the output of the second comparator 17.

The loss circuit 8 is inserted to reduce an echo in the one-way communication state and the interrupted communication state. Next, the operation of this echo suppressor will be described in connection with each of the idle circuit state, the one-way communication state and the interrupted communication state.

(1) Idle circuit state (the state in which the signal levels on both of the sending and receiving paths are lower than a certain level (for example, −31 dBmo).

Since the receiving voice detector 5 produces an output of "0", the switch 7 assumes the ON-state to hold both of the sending and receiving paths in the running state.

(2) One-way communication state 2-1: Sending state

The output of the comparator 23 is the state "1", and the switch 7 is the ON-state to hold the sending path in the running state, but the loss circuit 8 is inserted in the receiving path.

2-2: Receiving state

The output of the receiving voice detector 5 is the state "1", and the output of the comparator 23 is the state "0". The switch 7 is the OFF-state to cut off the sending path, so that an echo is cut off.

(3) Interrupted communication (interruption by a sending speech in a receiving state)

In the receiving state the switch 7 is the OFF-state, but when the input level of the sending side exceeds the input level of the receiving side by the near-end talker's voice, the output of the comparator 23 is altered from the state "0" to the state "1" to make the switch 7 switch to the ON-state, passing the sending speech signal to the far-end side and, at the same time, inserting the loss circuit 8 into the receiving path.

The invention performs such operations and hence has the following merits:

(a) Firstly, by the use of the convergent algorithm, the estimated echo return loss set in the variable loss circuit can be made approximate to an actual echo return loss, so that the interruption threshold level accords with the echo return loss of the circuit. As compared with the conventional system, cutting off of the sending speed signal is much reduced and, further, the hangover time for interruption can be shortened, resulting in decreased generation of the residual echo.

(b) Secondly, since the peak of the integrated value is detected, disturbance by an impulsive noise can be avoided.

What we claim is:

1. In an adaptive control echo suppressor of the type which includes a first comparator for comparing voice signal levels of sending and receiving paths with each other and which generates a signal to control cutting off the sending path to suppress an echo when the level of the voice signal of the receiving path is higher than the level of the voice signal of the sending path, the receiving path including a fixed loss when the first comparator does not generate the signal, and means responsive to the signal of the first comparator for cutting off the sending path and removing the fixed loss from the receiving path, the improvement comprising: a pair of integrator circuits connected for respectively integrating the voice signals of the sending and receiving paths to produce respective integrated voice signals defining the voice signal levels compared by said first comparator and for applying the integrated voice signals to said first comparator; a second comparator; a variable loss circuit controlled by the output of said second comparator independently of the output of the first comparator; means including said variable loss circuit defining a control signal path loop for applying the voice signal of the receiving path through said variable loss circuit and one of said integrator circuits to said second comparator for comparing the peak of the integrated voice signal of the receiving path with the peak of the integrated voice signal of the sending path to control said variable loss circuit to reduce the output of said second comparator to zero; wherein said pair of integrator circuits have predetermined time constants effective to prevent influence of sending and receiving path noise on the circuit operation; and means for applying an output of said one of said integrator circuits that receives the output of said variable loss circuit as the integrated voice signal of the receiving path applied to said first comparator.

2. An adaptive control echo suppressor according to claim 1, wherein said variable loss circuit is capable of functioning in a step-wise manner.

* * * * *